(12) United States Patent
Balbierer et al.

(10) Patent No.: US 9,413,549 B2
(45) Date of Patent: Aug. 9, 2016

(54) METHOD FOR ACTIVATING A NETWORK COMPONENT OF A MOTOR VEHICLE NETWORK SYSTEM

(75) Inventors: Norbert Balbierer, Kelheim (DE); Josef Nöbauer, Neukirchen-Balbini (DE); Andreas Rath, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 455 days.

(21) Appl. No.: 13/580,661

(22) PCT Filed: Feb. 22, 2011

(86) PCT No.: PCT/EP2011/052608
§ 371 (c)(1),
(2), (4) Date: Aug. 22, 2012

(87) PCT Pub. No.: WO2011/101491
PCT Pub. Date: Aug. 25, 2011

(65) Prior Publication Data
US 2012/0320793 A1    Dec. 20, 2012

(30) Foreign Application Priority Data

Feb. 22, 2010  (DE) .......................... 10 2010 008 818

(51) Int. Cl.
*H04L 12/40* (2006.01)
*H04L 29/08* (2006.01)
*H04L 12/12* (2006.01)
*H04L 12/46* (2006.01)

(52) U.S. Cl.
CPC .......... *H04L 12/40039* (2013.01); *H04L 12/12* (2013.01); *H04L 12/462* (2013.01); *H04L 12/40045* (2013.01); *H04L 2012/40273* (2013.01); *Y02B 60/32* (2013.01); *Y02B 60/34* (2013.01); *Y02B 60/35* (2013.01)

(58) Field of Classification Search
CPC .................... H04L 12/403; H04L 12/40039
USPC ........ 701/32.7, 34.4; 370/401, 389–392, 362, 370/256
See application file for complete search history.

(56) References Cited

U.S. PATENT DOCUMENTS 4,523,178 A * 6/1985 Fulhorst .................... 340/426.13
4,924,391 A * 5/1990 Hirano et al. ................ 701/34.3
5,467,272 A * 11/1995 Yoshida et al. .................... 701/1

(Continued)

FOREIGN PATENT DOCUMENTS

DE  100 31 891 A1  1/2002
DE  102 42 051 A1  3/2004

(Continued)

*Primary Examiner* — Wutchung Chu
(74) *Attorney, Agent, or Firm* — Cozen O'Connor

(57) ABSTRACT

A method and system for activating at least one temporarily inactive network component of a network system for a vehicle central network device of the network system is connected via signals to the network component by a path inside the network system extending at least partially across a network segment of the network system. The network segment connecting, via signals, the network component and a first activation device associated therewith to a switch device arranged in the path and to a second activation device associated therewith in an unbranched manner. The central network device responds to the first activation device by the switch device by sending a network function control signal.

15 Claims, 9 Drawing Sheets

(56) References Cited

U.S. PATENT DOCUMENTS

| | | | | |
|---|---|---|---|---|
| 5,483,230 | A | * | 1/1996 | Mueller ........................ 340/3.1 |
| 6,068,352 | A | * | 5/2000 | Kulkarni et al. ................ 303/20 |
| 6,075,438 | A | * | 6/2000 | Abe ........................ G05B 15/02 307/9.1 |
| 6,484,082 | B1 | * | 11/2002 | Millsap et al. .................. 701/48 |
| 6,885,916 | B2 | * | 4/2005 | Remboski ............... H04L 67/12 701/1 |
| 7,047,117 | B2 | * | 5/2006 | Akiyama ........... B60G 17/0195 700/2 |
| 7,532,640 | B2 | * | 5/2009 | Kelly ..................... H04L 69/08 370/352 |
| 7,869,458 | B2 | * | 1/2011 | Sonoda .................... H04B 3/36 370/464 |
| 8,448,035 | B2 | * | 5/2013 | Yamamoto .......... H04L 12/4013 714/748 |
| 2002/0006139 | A1 | | 1/2002 | Kikkawa et al. |
| 2003/0117298 | A1 | * | 6/2003 | Tokunaga ........... B60R 16/0315 340/989 |
| 2003/0120396 | A1 | | 6/2003 | Vollmer et al. |
| 2004/0078126 | A1 | * | 4/2004 | Huber et al. ..................... 701/36 |
| 2004/0083044 | A1 | * | 4/2004 | Akiyama ................ H04L 12/24 701/48 |
| 2005/0281213 | A1 | * | 12/2005 | Dohn ............................. 370/310 |
| 2006/0107295 | A1 | * | 5/2006 | Margis et al. .................... 725/81 |
| 2006/0155469 | A1 | * | 7/2006 | Kawasaki ............ B60R 21/013 701/301 |
| 2006/0192353 | A1 | * | 8/2006 | Schubert et al. ........... 280/5.502 |
| 2006/0229781 | A1 | * | 10/2006 | Nishimura ............ E05F 15/695 701/36 |
| 2006/0293190 | A1 | * | 12/2006 | Watson et al. ................ 505/126 |
| 2007/0015548 | A1 | * | 1/2007 | Flick .......................... 455/569.2 |
| 2007/0041387 | A1 | | 2/2007 | Ghoshal et al. |
| 2010/0098095 | A1 | * | 4/2010 | Kato ................... H04L 12/4625 370/401 |
| 2010/0215043 | A1 | | 8/2010 | Hisada |
| 2010/0217965 | A1 | | 8/2010 | Wolff |
| 2010/0312417 | A1 | * | 12/2010 | Wakabayashi et al. ........... 701/1 |
| 2011/0046844 | A1 | | 2/2011 | Honner et al. |
| 2011/0144858 | A1 | * | 6/2011 | Yun ................... H04L 12/40006 701/31.4 |
| 2011/0153121 | A1 | * | 6/2011 | Minassian ........................ 701/2 |
| 2012/0236525 | A1 | * | 9/2012 | Okada ............... H04L 12/40006 361/805 |

FOREIGN PATENT DOCUMENTS

| | | |
|---|---|---|
| DE | 20 2005 021 265 U1 | 7/2007 |
| WO | WO 2009/044915 A1 | 4/2009 |
| WO | WO 2009/054769 A1 | 4/2009 |
| WO | WO 2009054769 A1 * | 4/2009 |
| WO | WO 2010/097128 A1 | 9/2010 |

* cited by examiner

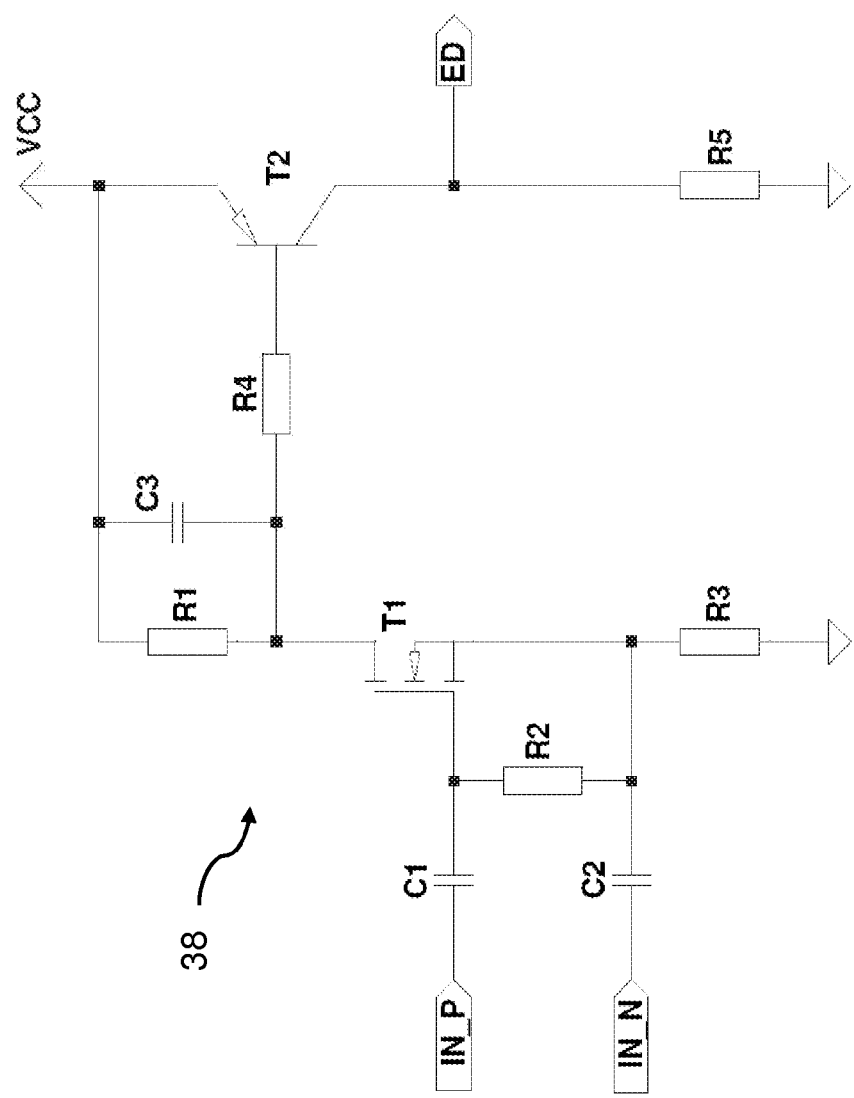

METHOD FOR ACTIVATING A NETWORK COMPONENT OF A MOTOR VEHICLE NETWORK SYSTEM

CROSS REFERENCE TO RELATED APPLICATIONS

This is a U.S. national stage of application No. PCT/EP2011/052608, filed on 22 Feb. 2011. Priority is claimed on the following application: Germany, Application No. 10 2010 008 818.8, Filed 22 Feb. 2010, the content of which is incorporated herein by reference.

BACKGROUND OF THE INVENTION

1. Field of the Invention

The invention relates to a method for activating at least one temporarily inactive network component of a network system for a vehicle, especially for a motor vehicle. The invention also relates to a corresponding network system.

2. Related Art

Known network systems for vehicles, particularly motor vehicles, are based in most cases on serial bus systems. An example of such a bus system for networking various control devices for implementing system-wide functions of a vehicle is an asynchronous, serial bus system based on the CAN bus (Controller Area Network). Another example is a LIN: Local Interconnect Network Bus System. Since the electrical power is supplied in many vehicles by an energy store of limited storage capacity, it is desirable that non-active parts of the network do not absorb any power or absorb as little power as possible.

In the bus systems used in the field of application for vehicles, an energy detection concept is used. The entire bus system is initially inactive; it is only an energy pulse on the bus line of the bus system that leads to the controller "waking up" and activating the entire system in response. In this context, the energy pulse can be, for example, a data frame or a single voltage pulse. In such a system, the demand for quiescent current is extremely low but all components connected to the bus system are activated and "wake up" in response to the pulse or signal.

For stationary networks, the "Wake on LAN" standard (WOL) has been established for some time (LAN: Local Area Network). It enables inactive hosts in the network to be selectively awakened by a so-called magic packet, an Ethernet frame that contains the MAC address of the host to be awakened and recognized by the corresponding host Ethernet controller.

However, this technology is unsuitable for use in the automotive or motor vehicle field since the network controllers themselves must be active or at least partially active to recognize such a packet. As a result, the demand for quiescent current is far too great for an automotive environment.

SUMMARY OF THE INVENTION

It is an object of the present invention, therefore, to provide a method for activating at least one temporarily inactive network component of a network for a vehicle in which individual network components can be activated selectively.

In a method according to one embodiment of the invention, a central network device of the network system is connected for signal transmission to the network component by a path inside the network system. The path leads at least partially across a network segment of the network system, the network segment connecting for signal transmission the network component and an associated first activation device unbranched to a switch device arranged in the path and to an associated second activation device. The central network device addresses the activation device through the switch device by sending a network function control signal. The central network device of the network system has, in particular, a network manager module.

The network component is an electrical device, particularly a control device, of a vehicle component of the vehicle, preferably of the motor vehicle. To minimize the energy demand of the vehicle, the electrical device is temporarily inactivated when it is not needed.

In a network system of particularly simple structure, the central network device of the network system is connected for signal transmission to the corresponding network component via, in each case, one path within the network system, the respective path leading entirely via a corresponding network segment. In this network system, the central network device includes the switch device itself or is connected to the switch device via signals by means of another network segment.

Whilst the network segment is unambiguously allocated to the respective network component, the other network segment can be allocated to a plurality of network components.

The network function control signal is preferably at least one voltage pulse applied by one component (e.g. a network device, switch device and/or network component) to the signal line of the corresponding network segment.

The method is used in particular for activating a temporarily inactive network component of a vehicle network system.

In this context, a complete network can consist of a single network system or a number of network systems linked to one another. If the complete network consists of a plurality of network systems, there can be a plurality of network devices which are central with respect to their associated system and which together form a global network management arrangement.

According to a preferred embodiment of the invention, a central network device supplies (a) the network component or (b) at least its associated first activation device additionally with electrical power at least during activation, by the switch device via at least one signal line (or data line, respectively) of the network segment.

In a preferred embodiment, a network function control signal is formed by the admission of the power supply via the signal line. The admission of the power supply results in a voltage change, particularly a voltage jump, on the corresponding signal line, which represents the network function control signal. In this case, the network component does not need any activation device constructed as an energy detection module, as the network component itself forms the activation device.

In particular, power is supplied simultaneously for the two-way alternate signal transmission between the first and second activation device via the signal line. In this arrangement, the signals and the supply power are combined (bundled) by a corresponding multiplex method and simultaneously transmitted via the signal line(s). This bundling is frequently also called "multiplexing". At the receiver end, the signals and the power supply are subsequently debundled again (demultiplexing).

According to a preferred embodiment of the invention, a first activation device activates the network component after receipt of the network function control signal and subsequently in turn sends out a further network function control signal to the second activation device for confirming the activation.

According to a further preferred embodiment of the invention, a second activation device brings the switch device into a transmitting/receiving state after receipt of the further network function control signal. With this step, the activation is completed and the network component can bidirectionally communicate with the switch device via the associated network segment.

According to a preferred embodiment of the invention, the network is an Ethernet network. In an Ethernet network, the network components and a central network device (e.g. as hosts), switch devices, and a corresponding network structure with network segments, which are allocated to respective hosts, are already known. The network function control signal is designed, for example, as NLP (NLP: Normal Link Pulses).

As an alternative, the network is a virtual Ethernet network in which—using the terminology of the OSI layer model—layer 2 (data link layer) is designed in accordance with the Ethernet protocol whilst layer 1 (physical layer) is designed differently from the Ethernet protocol. An example of such a virtual Ethernet network is a Broad-Reach-Ethernet network. This is a special implementation of the physical layer (layer-1 method) in which layer 2 (MAC layer) of the Ethernet protocol is used unchanged.

In a further preferred embodiment of the invention, the network function control signal is represented only by the "normal" data transmission, i.e. the plain sending of data with undefined content can be detected by the activation unit at the receiver end.

If the network component or at least its associated first activation device is supplied with electrical power via the signal line, the signal line is a corresponding data line of the Ethernet network. In general, a power supply via Ethernet is known by the term "Power over Ethernet" (PoE) in accordance with the IEEE 802.3af Standard. However, embodiments according to the invention of the power supply via Ethernet are not restricted to this standard.

According to a preferred embodiment of the invention, the network system has a tree topology formed by the central network device, the at least one switch device, and the network components. This topology is particularly suitable for implementing the method according to the invention. As an alternative, the network system preferably has a mesh topology.

In particular, the network component and/or the network device is a control device of a vehicle component or at least part of such a control device.

The invention also relates to a network system of a vehicle, especially a motor vehicle, preferably for carrying out a method suitable for activating at least one temporarily inactive network component. The network system according to one embodiment of the invention has a central network device connected via signals to the network component via a path within the network system, the path leading at least partially across a network segment of the network system and the network segment connecting via signals the network component and an associated first activation device unbranched to a switch device arranged in the path and to an associated second activation device. The central network device addresses the first activation device by sending a network function control signal via the switch device. The corresponding network system is a vehicle network system, particularly a vehicle network system of a motor vehicle.

The network component is an electrical device, particularly a control device, of a vehicle component of the vehicle, preferably of the motor vehicle. To minimize the power requirement of the vehicle, the electrical device is temporarily inactivated when it is not needed.

According to a preferred embodiment of the invention, the first network component or at least its associated first activation device can be supplied or is supplied with electrical power by the central network device by the switch device via at least one signal line of the network segment. The electrical power supply within the network is preferably an electrical power supply adapted to at least one parameter of the general power supply in the vehicle. This parameter is, for example, the voltage U, particularly the voltage of 12 volts (U=12 V) normally used in power supply systems (so called on-board systems) of motor vehicles.

It is provided, in particular, that the arrangement of supplying a switch device, supplied network component, first and second activation device, and the signal line connecting these components enables power to be supplied simultaneously for the two-way alternate signal transmission between the first and the second activation devices via the signal line.

According to a preferred embodiment of the invention, the network is an Ethernet network. In an Ethernet network, network components and a central network device (e.g. as hosts), switch devices, and a corresponding network structure with network segments, which are allocated to respective hosts, are already known.

According to a preferred embodiment of the invention, the network system has a tree topology formed by the central network device, the at least one switch device and the network components. This topology is particularly suitable for implementing the method according to the invention. As an alternative, the network system preferably has a mesh topology.

In particular, the network component and/or the network device is a control device of a vehicle component or at least part of such a control device.

Finally, the invention also relates to a motor vehicle comprising an aforementioned network system, particularly an Ethernet network.

BRIEF DESCRIPTION OF THE DRAWINGS

In the text which follows, the invention will be explained in an exemplary manner by the drawings. However, the invention is not restricted to the exemplary embodiments shown. In the drawings:

FIGS. 8-10 are exemplary schematic diagrams depicting three embodiments of activation devices.

DETAILED DESCRIPTION OF THE PRESENTLY PREFERRED EMBODIMENTS

Figure 1:
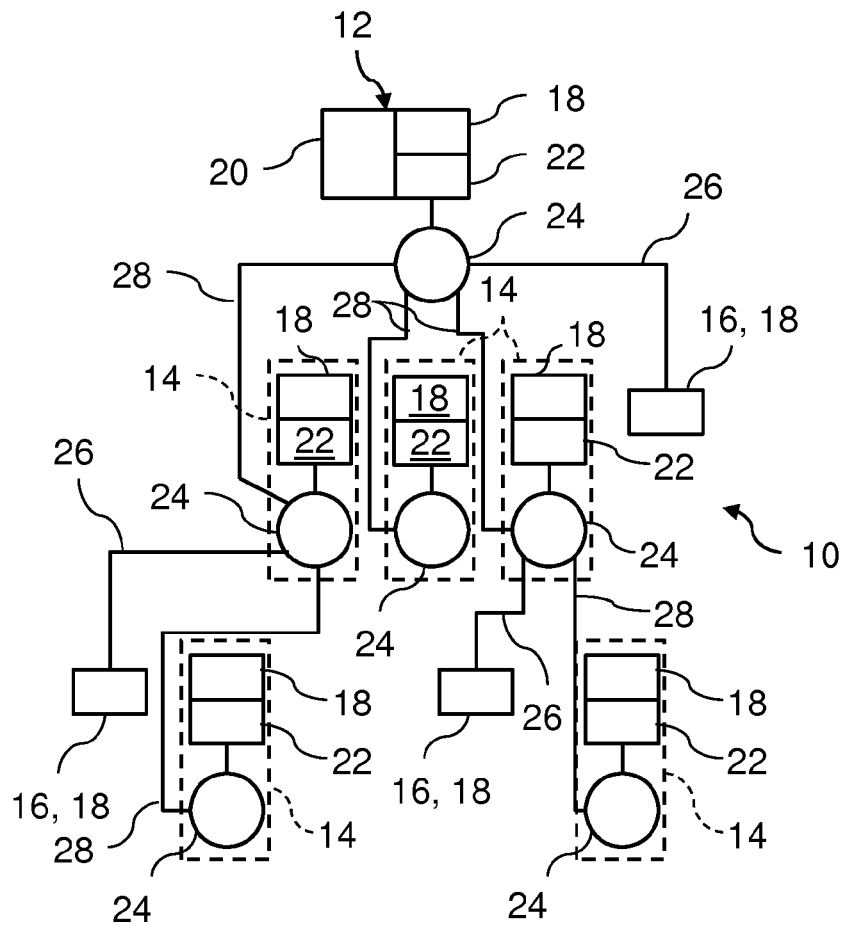
FIG. 1 is a block diagram of a network system according to an embodiment of the invention.

FIG. 1 shows a diagrammatic structure of a network system 10 according to one embodiment of the invention with a tree topology formed by a central network device 12, a plurality of switch devices 14, and a plurality of network components 16.

In this arrangement, the network system 10 is designed as an Ethernet network. The central network device 12 comprises a host 18, a network manager 20 (network manager module), a switch manager 22 (switch manager module), and a switch 24. The central network device 12 is connected via signals via a network segment 26 to a network component 18 and via three other network segments 28 to three switch devices 14 with switch 24, switch manager (switch manager module) 22 and host 18. The switch devices 14 are in turn connected for signal communication via network segments 26 to network components 16 and via other network segments 28 to other switch components 14, producing a tree structure.

Figure 6:
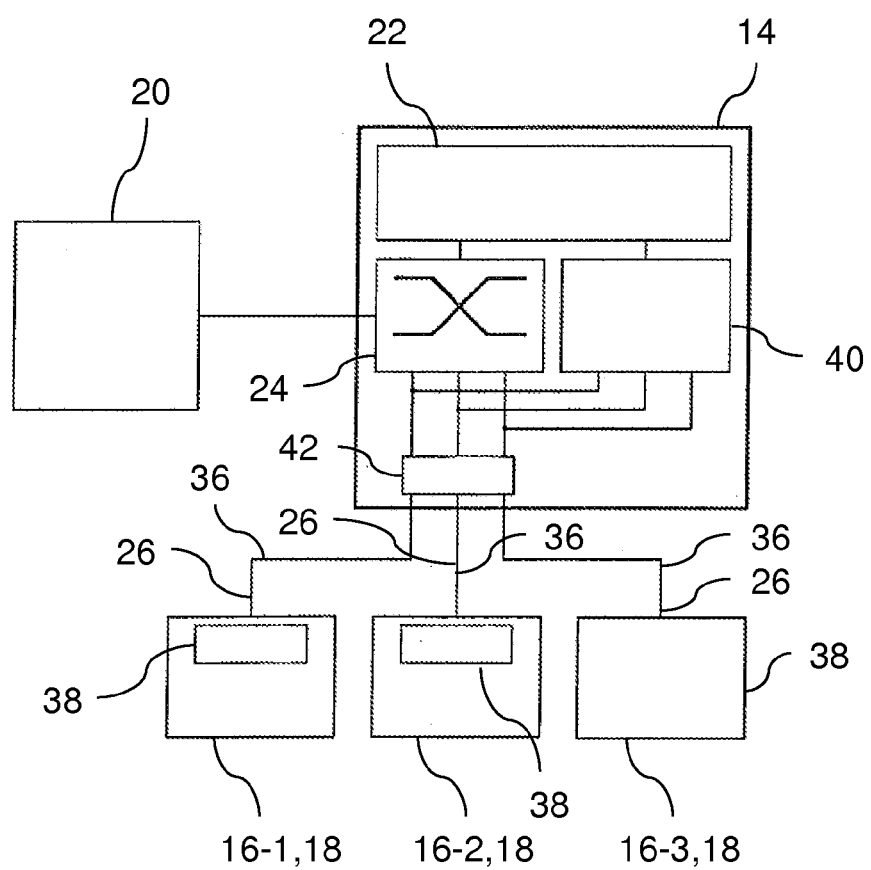
FIG. 6 is a block diagram of a network system according to an embodiment of the invention.

To each of the network components 16, a first activation device designed as a so-called "energy detection module" is allocated and to each of the switch devices 14, a second activation device designed as an "energy detection module" is allocated (activation devices not shown until FIG. 6). The power consumption of the first activation device is less than the power consumption of the associated active network components 16, and the power consumption of the second activation device is less than the power consumption of the associated active switch device 14 and of the associated central network device, respectively.

Figure 2:
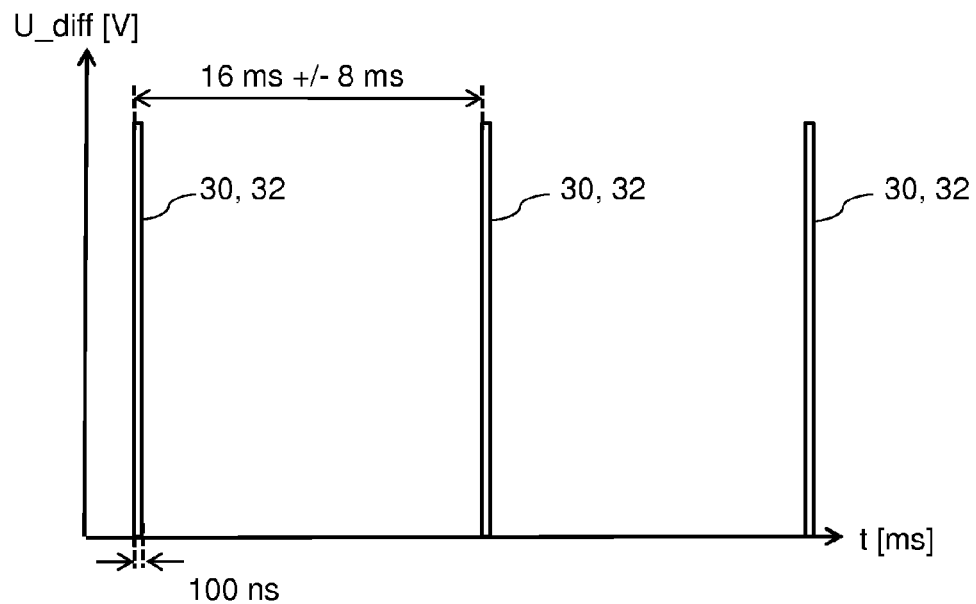
FIG. 2 is a network function control signals configured as so-called "normal link pulses"

FIG. 2 shows a sequence in time of network function control signals 30, designed as rectangular pulses (more precisely so-called NLPs—Normal Link Pulses) for testing the state of a connection (of a link) in an Ethernet network. For this purpose, the voltage U_diff is plotted against time t in a graph. The network function control signals 30, that is to say the pulses 32 (NLPs), have a pulse width of 100 ns and a pulse spacing of 16 ms+/−8 ms.

According to an embodiment of the invention, these network function control signals 30 are used for activating a temporarily inactive network component 16 and for confirming the activation.

The following functionality results within a network system 10 in which a central network device 12 is connected through signal transmission to the temporarily inactive network component 16 via a path inside the network system 10, wherein the path leads at least partially across a network segment 26 of the network system 10 and the network segment 26 connects through to the signals, the network component 16 and an associated first activation device unbranched to a switch device 14 arranged in the path and to an associated second activation device, the following steps being provided: the central network device 12 addresses the first activation
    device of the network component 16 by the switch device 14 by sending a network function control signal 30, and
the first activation device activates the network component 16
    after receipt of the network function control signal 30 and subsequently in turn sends out a further network function control signal 30 to the second activation device of the switch device 14 for confirming the activation, whereupon the second activation device brings the switch device 14 into
    a transmitting/receiving state after receipt of the further network function control signal 30.

In the text which follows, the resultant functionality and arrangement will be described again using different terminology.

A Switched Ethernet consists physically of point-to-point connections. Thus, an energy detect principle can be applied individually for individual hosts 18. It would not wake up the entire network since only one host 18, especially a network component 16, and one switch port of the switch device 14 are connected physically to a line (the network segment 26).

By selectively controlling the activity on a link, a host 18, especially a network component 16, can accordingly be activated or deactivated selectively. For this purpose, the switch 24 has to switch the respective port on or off. When the port is switched on, link pulses (NLPs) 32 are applied to the line (the network segment 26).

The link pulses 32 can be detected by an activation device designed as energy detect module and their presence can be indicated by an electrical output. The state of this output can trigger a wake-up (an activation) or a shut-down (an inactivation).

The ports are configured by the switch manager (the switch manager module) 22. This is software responsible for the entire configuration, monitoring, and control of a switch 24. Each port of a switch 24 is modeled and treated by the switch manager 22 as a finite state machine.

The network manager (the network manager module) 20 forms the centerpiece of the concept. It is the central management node that has the job of configuring and monitoring the entire network (networks system 10). This software has an overview of the entire topology of the network 10 and of the state of the individual hosts 18. It can communicate with the individual switch managers 22 and thus allow individual hosts 18 to be activated and deactivated selectively.

The overall concept represents the interactions between the three individual modules (central network device 12 with network manager 20, network component 16 with the first activation device, and switch device 14 with switch manager 22 and the second activation device).

The first question arising with respect to the structure of the network management is whether this is a centralized or a distributed management architecture. Although distributed management offers greater reliability, it is significantly more complex and difficult to handle. In addition, the necessary communication between the distributed management nodes causes additional data load. As a rule, a simple, uncomplicated management concept is the better choice. It is in this sense that the concept used here is also designed.

For this reason, the management concept presented is central (with central network device 12). Thus, the network manager 20 is a central entity and not distributed over a number of network nodes. As already mentioned, it is responsible for all management tasks concerning the network. It knows the topology of the network 10 and knows the state of all hosts 18 located in the network. Within the context of the present concept, only the power management field is covered but the network manager 20 can also handle all other necessary management functions.

At the next level of hierarchy, there is an arbitrary number of switch devices 14 with switches 24. These are "managed switches" having an arbitrary number of ports. The switch manager 22 of the switch device 14 is responsible for configuring and controlling the switch 24 and can communicate with other network nodes.

At the ports of these switches 24, other switches 24 can be connected as the next level of hierarchy. In this context, there can be an arbitrary number of such hierarchy levels. The end points of these tree branches are the hosts 18. The switches 24 themselves can also be located on host devices (hosts 18) and form the switch devices. The switch manager 22 and the host software can run as two processes on one and the same CPU.

The switch manager 22 represents the communication partner of the network manager 20. If a node is to be activated, the network manager 20 contacts the corresponding switch (manager) 22, 24, to which the relevant node is connected, and requests activation of the corresponding port. Thus, each active switch manager 22 must have a valid path to the network manager 20.

As shown in FIG. 1, it is possible to configure the network 10 as a tree having an arbitrary number of hierarchy levels. The root of the tree is the central network device 12 with network manager 20 and switch 24, to which it is connected. The following levels consist of hosts (end points) 18 or other switch devices 14 with switches 24 and, as a rule, with hosts 18 as interfaces to the respective next hierarchy level. The port via which a switch 24 is connected to the next hierarchy level above will be called the root port (analogously to the designation in the Spanning Tree protocol) in the text which follows. It is important that each active manageable node with switch manager 22 needs a valid connection with the network manager 20.

In the text which follows, some basic principles, on which the power manager concept is based, will be described in detail.

The network function control signals 30 shown in FIG. 2, designed as link pulses or NLPs, respectively, are short voltage pulses applied by a subscriber in the Ethernet to its transmitting line of network segments 26, 28 whilst there is no transmitting traffic.

They are used for testing the state of the link. A subscriber detects a link error when no pulses 32 (and no data traffic, either) are received for 50 ms-150 ms. In the case of 10 BASE-T Ethernet, these pulses 32 are called Link Integrity Test (LIT) pulses; in the case of 100 BASE-TX and auto negotiation, they are called Normal Link Pulses (NLP). Auto negotiation (100 BASE-TX) uses a sequence of up to 33 such pulses 32, the communication parameters of the transmitter (speed, full- or half-duplex) being encoded in this sequence. These sequences are called "Fast Link Pulse (FLP) bursts".

The basic shape of the NLPs is shown in FIG. 2. The precise specification of the pulse shape is disclosed in IEEE 802.3 Clause 14.3.1. The Link Integrity Test itself (that is to say also the sequence in time of pulses 32) is specified in IEEE 802.3 Clause 14.2.1.7.

The FLP bursts which are used for auto negotiation have the same shape but at a maximum sequence; only 33 pulses and at a minimum, 17 such pulses are sent spaced apart by 125 µs. The bursts are also spaced apart by 16 ms+/−8 ms.

If the PHY of a port is activated, it sends out such pulses. Depending on the configuration of the switch/controller (IOOSASE-TX), the pulse are sent as FLP bursts (auto negotiation) or as NLPs, if auto negotiation is deactivated.

The Energy Detect Module (EDM) is a system which is capable of detecting NLPs or FLP bursts, and indicating their presence in a suitable form; it is necessary for each port on each device, i.e. a 4-port switch must have four EDMs or one EDM with four inputs and outputs. The EDM must be connected to the Rx line of the port but must not influence the reception of frames.

Advantageously, all IP addresses of the Ethernet network are static and known to the network manager (or the corresponding software, respectively).

However, the concept is not restricted to this. The possibilities for issuing IP addresses are open. For example, dynamic assignment by DHCP would be possible. The way in which the network manager learns the IP addresses of the hosts 18 is open.

Furthermore, in the initial state of the network system 10, the network manager module 20 and the associated switch 24 of the central network device 12 are advantageously always active. This is made clear again by the active role of the central network device 12 in the method for activating the temporarily inactive network component of a network system. Although this permanent activity is not absolutely necessary since a device activated from "outside", during an attempt of establishing a connection to the network manager 20, would mandatorily activate it, but as a rule, the network management software will wish to establish a type of basic state of the network 10, i.e. activate selected control devices. The concept is not restricted to this, either.

To provide a simpler description, the processes running in the network system (network) 10 in order to activate and deactivate hosts 18 and part-networks can be considered at two levels, namely the hardware level and the software level.

At the hardware level, the manner in which hosts 18 and switches 24 physically activate and deactivate one another and can be notified by an external activation/deactivation is specified.

At the network level, it is defined how shutdown and wake-up processes (deactivation and activation processes) are running in the network, using the mechanisms specified at the hardware level.

Whilst the hardware level thus defines how two adjacent network nodes (hosts 18 and switches 24) interact with one another physically, the network level specifies the principle according to which a node in the network can activate an arbitrary other node via the network management software, how the network management software activates the node and how it can deactivate a node.

Interactions at the hardware level are described below.

Two adjacent nodes, for example a switch 24 and a host 18, must be capable of activating one another when it is necessary to inform one another about any activation which has taken place or to deactivate another when demanded by the network manager 20.

The switch manager 22 treats each port of its switch 24 as a finite state machine (FSM). By this model, a port can be controlled and monitored in a simple manner. Thus, a manager of a 4-port switch simultaneously manages four mutually independent FSMs. Firstly, the model will be explained briefly here. After that, it is explained by the state machine how the individual mechanisms of the hardware level are running.

Each port has four normal states:
1) UP means that the PHY of the respective port is in the activated, normal state and a valid link exists. Both sides (switch and host) transmit and receive NLPs and can transmit frames if required.
2) DOWN designates the deactivated state of the port. The PHY is in the power-down state, no NLPs are transmitted, data cannot be transmitted.
3) HOST STARTUP is a state of transition in which the PHY is activated and applies NLPs to the transmitting line. The host connected to the port is not yet active and does not yet send any link pulses. Thus, no valid link is recognized yet by the switch 24.
4) HOST SHUTDOWN is also a state of transition, this time for shutting down a connected host 18.
The port PHY is deactivated and does not send any NLPs. The host 18 is, however, still active and sends NLPs which are indicated by the EDM of the port.

Furthermore, there are two error states:
1) LINK FAIL indicates that a previously valid link has unexpectedly broken down.
2) ERROR is a global error state into which the system changes on the occurrence of other errors, the type or cause of the error being stored.

Activating a host 18 designed as a network component 16 by a switch occurs as follows.

A switch 24 must be capable of activating a deactivated host 18 connected to it on request of the network manager 20. The so-called "port state machine" shown in FIG. 4 meets this requirement.

If the network manager 20 requests the activation of the host 18, this leads to a state transition into the HOST STARTUP state. In this context, the PHY of the port is activated and begins to send NLPs. The state machine remains in this state as long as no NLPs are received from the host 18.

If the EDM of the host 18, that is to say the first activation device, detects the link pulses 32 (NLPs) of the switch device 14, it triggers the booting process of host 18 in a suitable manner. As soon as the Ethernet controller of host 18 is started, its PHY begins in turn to send link pulses 32. These are detected by the EDM of the switch, that is to say the second activation device, and indicated. This event leads to a change of state of the FSM into the UP state. Both sides detect NLPs, that is to say the link is valid and the connection has been established. It is now possible to transmit frames.

If an error occurs during the booting process of host 18 and no NLPs are sent back, a time out event takes place, the finite state machine (FSM) changes into the global error state and indicates a STARTUP_TIMEOUT.

Notification of the switch device 14 about an external activation by host 18 occurs as follows.

If a host 18 is not activated following an initiative of the network manager 20 but from the outside or by a user, respectively, and if its switch 24 is still deactivated, the host 18 must inform its switch about this so that it activates its port PHY.

The finite state machine (FSM) is in the DOWN state. As soon as the network controller of host 18 begins to send NLPs, these are detected by the EDM of the switch and indicated. This leads to a change of state from DOWN to UP, the PHY of the port being activated and in turn sending NLPs. Both sides will now detect NLPs, the link is valid and frames can be transmitted.

Activation of the switch device by host 18 occurs as follows.

As soon as the network controller of host 18 begins to send NLPs, the NLPs are detected by the EDM of the switch. The device which contains the switch manager 22 must now be booted in a suitable manner. The switch manager 22 must thereupon activate switch 24 and place it into its basic state. All FSMs are in the DOWN state after the booting process.

A switch device 14 activates a switch device 14 of the next hierarchy level below as follows.

If a switch 24 of the next hierarchy level below is to be activated, this is effected by the same mechanism. The hierarchically higher switch receives from the network manager 20 the request to activate the corresponding port. It makes no difference to it whether a host 18 or a switch 24 is connected to the port. The FSM changes into the HOSTSTARTUP state and the PHY is activated (NLPs are transmitted).

The EDM of the hierarchically lower switch 24 indicates the NLPs and switch 24 is started up and immediately activates its root port. This leads to a change of state from HOST STARTUP to UP in the hierarchically higher switch 24; both sides detect link pulses and the connection is established.

A switch device 14 activates a switch device 14 of the next hierarchy level above as follows.

Host 18 is activated from the outside and in consequence activates its respective associated switch 24. This, in turn, must activate the hierarchically above next switch 24 in order to establish a connection to the network manager 20. For this purpose, the switch manager 22 must know via which port it is linked to the next hierarchy level above (it must know its root port). For example, a port number is defined which applies globally for all switches 24 as connection to the next hierarchy level (e.g. port 1). Another possibility would be a memory entry which is specified individually for each switch.

Figure 4:
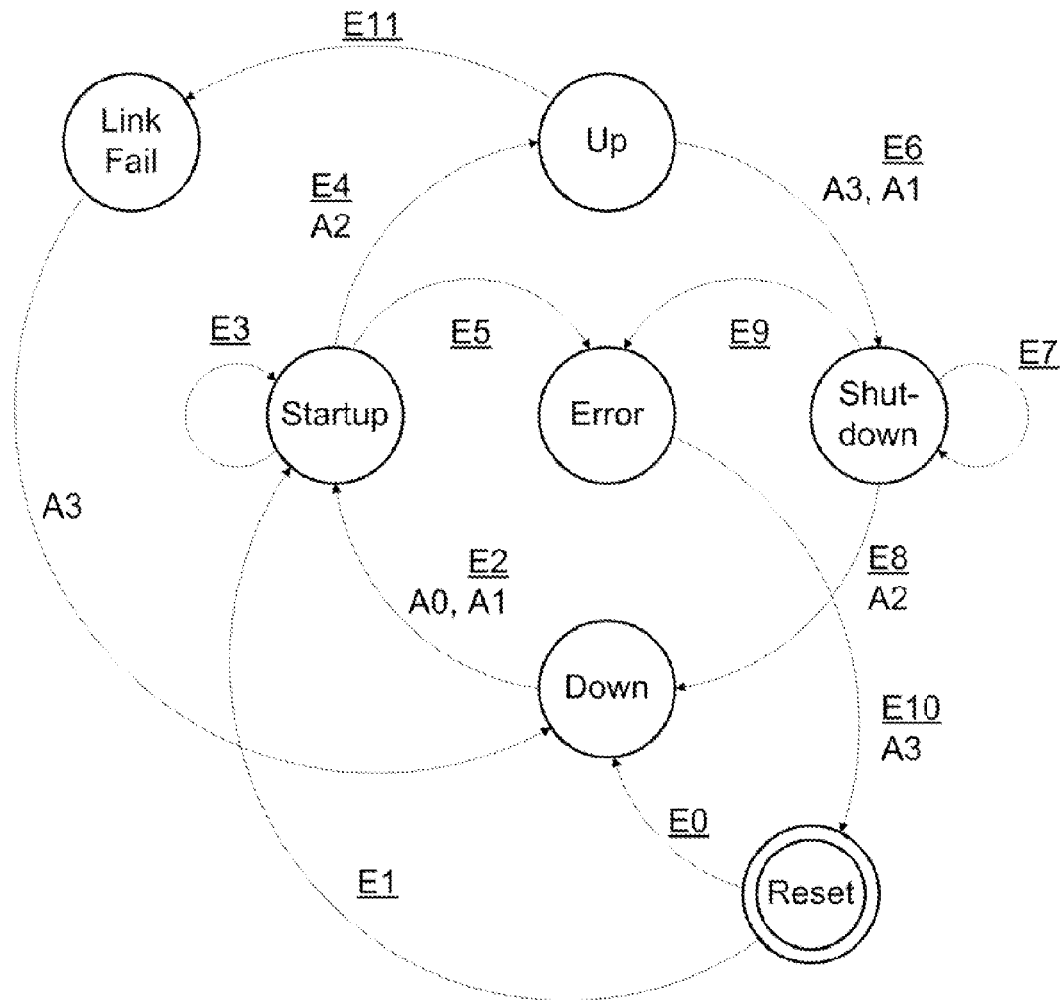
FIG. 4 is a state diagram of a so-called "port state machine" of a network system.

According to the state diagram of FIG. 4, the FSM of the root port changes immediately into the HOST STARTUP state after booting. The higher-level switch is awakened by this means by the NLPs sent via the root port.

Deactivating host 18 by the switch device 14/switch 24 occurs as follows.

If a switch device 14 receives the request from the network manager 20 to deactivate a host (port) 18, this can also be achieved by the port state machine.

The request by the network manager 20 has the consequence that the FSM of the port changes from the UP state into the HOST-SHUTDOWN state, the PHY of the port being deactivated (no further NLPs are sent). The FSM remains in this state until no further NLPs arrive from the host 18.

The network controller of the host will report a "link fail" as soon as it receives no further NLPs from the switch. This event can be used as a trigger for the shutdown process of the host. However, as an alternative, the output of the host EDM could also be used since it will no longer indicate any link activity. The precise procedure remains open.

If the host shuts down, it will stop itself from sending NLPs. In the port FSM of the switch, this leads to a change in state from HOST SHUTDOWN to DOWN. The interface is thus deactivated, the host is shut down and the request is met.

If something goes wrong when shutting down the host and further NLPs are sent by it, the state machine of the switch changes into the ERROR state after a defined time and deposits a shutdown timeout as an error.

Deactivating of a switch by a switch occurs as follows.

If a switch is intended to deactivate a hierarchically lower switch, the mechanism proceeds similarly to the deactivation of a host by a switch. The case where a switch deactivates a hierarchically higher switch does not exist since it would cut its own connection to the network manager 20 and is impossible by definition.

It makes no difference to the switch whether a host 18 or a switch 24 is connected to the port to be deactivated. The hierarchically lower switch (manager) to be deactivated knows via which port it is connected to the next hierarchy level above. If it receives no further NLPs from this port, this is the trigger for it to initiate shutdown. By definition, the network manager 20 has already switched off all ports of the switch 24 to be deactivated before it shuts down switch 24 itself.

Initially, the port FSM changes into the LINK FAIL state since no further NLPs are received. From there, the next change of state leads into the DOWN state, and the interface is now deactivated. The switch manager can now initiate the shutdown process of the switch and then shut itself down.

Interactions at the network level—communication between network manager 20 and the switch manager occurs as follows.

As already discussed, the network manager is responsible for requesting the respective switch managers to activate or deactivate their ports. Since the network manager knows the topology of the network and the state of the nodes at any time, it can thus establish any desired configuration in getting individual hosts or entire part-networks to become activated or deactivated. This presupposes that every active switch manager has a valid connection to the network manager (the root of the tree). If the end point of a branch is active, the entire branch must therefore be active.

The manner of communication between the network manager and the switch managers is not established. It is a requirement that the network manager can inform the switch manager about its intention and the port which is involved and that the switch manager 22 can convey messages to the network manager 20 when one of its connected nodes has been activated. The network manager 20 can thus update its state table.

The Simple Network Management Protocol (SNMP), for example, is well suited for this. The Interface Management Information Base (IF-MIB) is available which, among other things, contains the managed object with the object ID (OID) (ifAdminStatus). This object specifies the desired state of an interface (port). If the network manager has an SNMP controller process and the switch managers have in each case an SNMP agent, the network manager 20 can send an SNMP SET packet to the switch manager 22 and set the object ifAdminStatus to the desired value.

The notification about when a node has been activated can be carried out via an SNMP TRAP packet sent by the agent. In response to the TRAP, the switch manager 22 would have to send back an SNMP GET packet and read out the values of the ifAdminStatus object for each port and correspondingly update its state table. Since SNMP also offers a multiplicity of further management options, this basis can also be used as a platform for further network management.

A less extensive, slimmer method could be to define own wake-up, shut down and notification frames which contain the relevant port number. The disadvantage of this method is that it is not standardized and does not offer an existing platform for further management functions.

Host requests occur as follows.

In most cases, an active host needs a "dialog partner" with which it can exchange data. As a rule, the network manager knows the existing dependencies between various hosts and will itself activate all necessary network nodes in the appropriate order.

However, the possibility also exists that a host needs a different host for a short term which, however, is currently inactive. The principle of centralized management does not provide for a host waking another one independently. The host must request the activation of the other one from the network manager. The network manager can then decide whether to wake up the requested host (authorizations could play a role here) and, if necessary, perform the wake-up. As soon as the notification arrives from the "destination switch" that the requested host has been activated, the network manager can convey the confirmation to the host from which the request came.

Treatment of cascaded switches are as follows.

It has already been explained that each switch manager must have a path to the network manager, which is to say that there can be no "gaps" in the branches of the tree.

Activation of a node via a switch 24 which is already active is handled as follows.

If a node is to be activated which is connected to a switch 24 which can already be reached, the case is trivial. The network manager 20 requests switch 24 to activate the corresponding port.

Activation of a branch by the network manger 20 occurs as follows.

This situation becomes more complicated if the node to be activated is on an as yet inactive switch or at the end of a branch of inactive switches, respectively. The network manager 20 knows the topology and must then wake up each switch 24 along the path to the destination node sequentially until it can reach the destination switch and can thus activate the desired node. Thus, the entire branch up to the destination node is activated.

Deactivation of a branch by the network manager 20 occurs as follows.

The deactivation of a branch proceeds analogously to the activation. The network manager 20 knows the topology and deactivates sequentially all nodes which are located below the switch 24 that is to be switched off.

Figure 3:
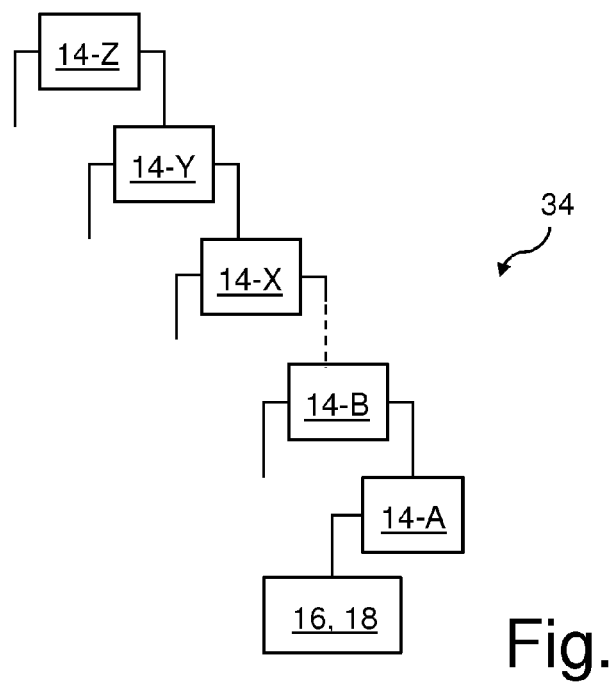
FIG. 3 is a block diagram of a section of a network system according to one embodiment of the invention.

FIG. 3 illustrates the activation of a branch 34 by a user. If a host 18 which is part of an inactive branch 34 is activated from the outside, the "host activates switch" case initially occurs. Considering again the port state machine of switch 24, the recursive propagation of the wake-up through the entire branch 34 becomes clear:

The first switch 24-A attempts to set up a connection to the (not yet accessible) network manager 20 and initially activates its root port. However, the root port FSM remains in the HOST STARTUP state until NLPs are received from the next switch 24-B above.

The next switch 24-B above will boot up and will firstly activate again its root port in order to establish the connection to the network manager 20. However, it remains in the HOST STARTUP state until it receives NLPs from its root port, that is to say from switch 24-C. This pattern continues recursively up to the first switch 24-Z already active. If the entire branch 34 was inactive, this would be the highest switch 24 to which the network manager 20 itself is connected.

The first switch 24-Z already previously active already has a connection to the network manager 20 and will respond immediately to the NLPs of the next switch 24-Y below. At the same time, it will inform the network manager 20 about the activation of the corresponding port. Since the next switch 24-Y below now receives NLPs, the FSM of its root port changes from the HOST START to the UP state and there is a connection to the next switch 24-Z below and thus to the network manager 20. Switch 24-Y can now respond to the, in turn, next switch 24-X below (the FSM of the port changes from HOST STARTUP to UP and NLPs are transmitted). At the same time, switch 24-Y informs the network manager 20 about the activation of switch 24-X.

This pattern continues up to the end of branch A so that the notifications are sent to the network manager in the "from top to bottom" order (the wake-ups, in contrast, propagate "from bottom to top" through the branch). This is necessary too, since a switch can notify the network manager only when it has a connection to it.

The corresponding port state machine is illustrated in FIG. 4.

Starting from a "reset" (or "boot") state, the alternative events are initially obtained that the port is not a root port (E0) which leads to a "down" state of the port, or that the port is a root port (E1) which leads to a "startup" state.

However, the "startup" state can also be reached from the "down" state by a "wake-up" request (E2) from the network manager 20 by activating the PHY actions (A0) and timer resetting (A1). If activity of the host 18 is lacking and the timer (E3) is running, the port remains in the "startup" state.

Starting from the "startup" state, the "up" state is reached by a host activity (E4) in which the network manager 20 is activated (A2). As an alternative, only an "error" state is reached from "startup" when host activity is lacking and there is a timeout (E5).

From the "up" state, the "shutdown" state is reached by a "shutdown" request (E6) from the network manager 20, PHY being deactivated (A3) and the timer being reset (A1).

If the host 18 is subsequently still active and the timer is running (E7), the port remains in the "shutdown" state. If there is no further host activity (E8), the network manager 20 is notified and the "down" state is reached. If, in contrast, there is a timeout while the host 18 is still active (E9), an "error" state occurs.

From the "error" state, the "reset" state is reached (again) by a reset (E10) in which PHY is deactivated (A3).

As an alternative to the "shutdown" request (E6) a "link fail" state is reached by due to a lack of link activity (E11) from the "up" state whereupon the Deactivate PHY action follows (A3) and the "down" state is reached.

This completes the description of the port state machine shown in FIG. 4.

Figure 5:
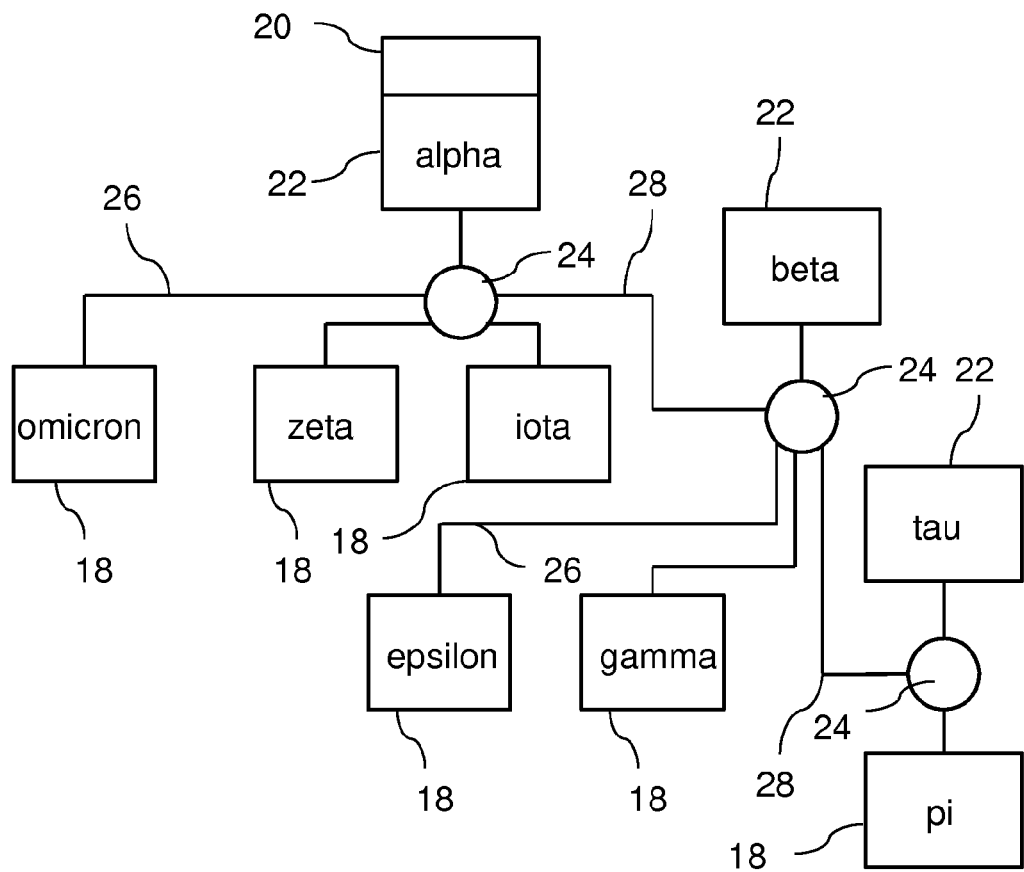
FIG. 5 is a block diagram of a network system according to an embodiment of the invention.

In the text which follows, the functionality described is illustrated by selected examples with reference to FIG. 5.

The network is a switched Ethernet which consists of three switches 24-S1, 24-S2, 24-S3 to which a plurality of hosts 18 are connected (see FIG. 5). The switch managers 22 are switch manager 22-alpha, switch manager 22-beta, and switch manager 22-tau. Some hosts 18 can be activated and deactivated from the outside (e.g. by a user or an event) and are called "awakeable" in the text which follows. On the other hand, other hosts 18 can only be awakened and deactivated within the network, i.e. on the initiative of a switch 24 or of another host 18 (not wakeable).

Switch 24-S1 has a special role. It forms the root of the topology tree and its switch manager 22-alpha is at the same time the central network manager 20.

In the examples, SNMP is used for the communication between network manager 20 and the various switch managers 22. The network manager 20 has an SNMP client for sending SNMP packets, and the switch managers have an SNMP agent.

Activation of host 18-omicron occurs as follows.

This example demonstrates the activation of individual hosts 18 in the network by the network manager 20. In the initial situation, the entire network system 10 is deactivated apart from the host 18-S1/alpha constructed as central network device 12. The network manager 20 of this central network device 12 would now like to establish a state in which the hosts 18-omicron and 18-epsilon are active.

Initially, host 18-omicron is activated. It is connected directly to the root switch S1 (port S1-1). The network manager 20 accesses the SNMP client of host 18-alpha and sends an SNMP SET packet to the SNMP agent from host 18-alpha. As a consequence, the object ifAdminStatus for port 81-1 is set to TRUE.

The SNMP agent informs the switch manager of switch 24-S1 of this.

This event leads to a change in state of the state machine of the port from DOWN to HOST STARTUP and thus to activation of the PHY of port S1-1, whereupon NLPs are sent out. The EDM of host 18-omicron (a network component 16) detects these NLPs and triggers the booting process of host 18-omicron. As soon as the network controller of host 18-omicron is active and sends NLPs, the EDM of the switch 24-S1 detects this and a HOST STARTUP to UP change in state takes place. In this context, the network manager is informed that the node connected to port S1-1 has been activated.

Activation of host 18-epsilon (also a network component 16) occurs as follows.

Host 18-epsilon is also to be activated. The network manager 20 knows that it can reach host 18-epsilon via switch 24-S2 and thus via its port S1-4. It also knows that switch 24-S2 and its switch manager 22-beta are still inactive and thus have to be activated first. Firstly, an SNMP SET packet is again sent to the SNMP client from host 18-alpha (in this case the central network device 12) to turn on port S1-4. According to "switch activates switch of the next hierarchy level below", the EDM of switch 24-S2 detects the NLPs, the switch 24 and switch manager are started up and the root port of switch 24-S2 is activated. Switch 24-S2 and switch manager 22-beta are now active and there is a valid connection. The network manager 20 is also notified that the node connected to port S1-4 (that is to say S2/beta) has been activated.

To activate also host 18-epsilon, precisely the same procedure is adopted as in the previous case during the activation of host 18-omicron. The only difference is that the SNMP client and agent are no longer located in the same device but, instead, the SNMP SET packet is sent to switch manager 22-beta.

Activation of host 18-pi by the user occurs as follows.

The entire network system 10 apart from switch 24-S1 and switch manager 22-alpha, which, at the same time, is network manager 20, will be completely deactivated Host 18-pi is activated from the outside (by a user or an event). The cascade consists of three switches, 24-S3, 24-S2 and 24-S1.

Host 18-pi firstly wakes up switch 24-S3 and switch manager 22-tau and waits for NLPs from switch 24-S3. As the first action, switch manager 22-tau will activate the root port of S3 (port S3-1) and wait for NLPs from switch 24-S2.

Analogously, switch device 14-S2/beta will wake up and the switch manager 22-beta, in turn, will activate the root port of switch 24-S2, that is to say port S2-1. Switch 24-S1 which is already awake thereupon turns on the PHY of port S1-4.

Switch device 14-S2/beta detects the NLPs from switch 24-S1. The root port FSM changes into the UP state and the switch manager 22 now begins to process the NLPs arriving from port S2-4. The FSM of this port changes into the UP state, the PHY is activated and NLPs are sent back. In addition, the network manager 20 is informed that the node connected to S2-4 has been activated.

The same process now takes place one level lower with switch device 14-S3/tau and port S3-2. As soon as the NLPs are answered by host 18-pi, the network manager 20 is informed that the node connected to the port S3-2 has been activated.

The wake-up has run through the cascade from bottom to top, but the notifications to the network manager 20 have done so from top to bottom.

Deactivation of the entire branch 34 occurs as follows.

The network manager 20 now decides that the branch 34 just activated (that is to say switch 24-S2, 24-S3, host 18-pi) should be deactivated again. This is done from bottom to top: the network manager 20 will sequentially deactivate host 18-pi, switch device 14-S3/tau and switch device 14-S2/beta. If, for example, host 18-epsilon were still active, the network manager 20 would also deactivate it before it shuts down switch device 14-S2/beta.

Initially, host 18-pi is deactivated by an SNMP SET packet being sent to the switch manager 22-tau, the ifAdminStatus object for port S3-2 being set to FALSE. The FSM of the port changes into the HOST SHUTDOWN state, deactivates the PHY and in this state waits until no further NLPs are sent by host 18-pi. After that, the state changes to DOWN and the network manager 20 is informed that the node at port 53-2 has been deactivated.

Then, host 18-alpha sends a further SNMP SET packet to host 18-beta to analogously deactivate port S2-4. This shuts down the switch device 14-S3/tau.

Lastly, host 18-alpha sends an SNMP packet to itself in order to deactivate port S1-4. Switch device 14-S2/beta is now also shut down and the entire branch 34 is deactivated.

FIG. 6 is a block diagram of a simple network system 10 or, respectively, a part of a network system 10 according to a further embodiment. This comprises the network manager 20 and an arrangement of switch device 14, network components 16 and the signal lines 36, connecting them, of the corresponding network segments 26. The network components 16 (16-1, 16-2), designed as control devices of the corresponding motor vehicle, have associated first activation devices 38 designed as energy detect modules. The switch device 14 has the switch manager 22, the switch 24, a voltage supply 40, and the second activation device 42 designed as an energy detect module. The switch manager 22 is connected via signals to each of these components for controlling switch 24 and voltage supply 40. The signals and the supply line are combined (bundled) by a corresponding multiplex method, supplied to the second activation device 42 and from there transmitted simultaneously via the signal line(s) 36.

The network component(s) 16, or at least its associated first activation device(s) 38, can be supplied with electrical power by the central network manager 20 by the switch device 14 via the at least one signal line 36 of the network segment 26 in this arrangement. For this purpose, the switch device 14 has the voltage supply 40.

The arrangement of supplying switch device 14, supplied network component 16, first and second activation devices 38, 42 and the signal line 36 connecting them provides simultaneous multiplexing of a power supply simultaneously for the two-way alternate signal transmission between the first and second activation devices 38, 42 via the signal line 36.

The network components 16 designed as control devices do not have their own voltage supply but are supplied by the voltage supply unit 40 via the signal line 36 designed as an Ethernet line. The network components 16 are turned off ("zero power"). In the first step, the network manager 20 communicates with the switch manager 22 of the switch device 14 and activates the voltage supply 40, coupled via Ethernet, for the network components 16-1 and 16-2. Network components 16-1, 16-2 are now supplied with power but are still in an idle state ("low power"). Network component 16-3 is not supplied with voltage ("zero power").

The following activation scenarios result. Activation of the network component 16-1 by the network manager 20 occurs as follows.

The network manager 20 activates the network component 16-1 by communicating with the switch manager 22 of the switch device 14 and lets it turn on the port to which the network component 16-1 is connected. The network component 16-1 is equipped with its first activation device 38 and is awakened up by the activity on the corresponding line 36. The further sequence is then as described before.

Activation of the network component 16-2 by a user occurs as follows.

The network component 16-2 is activated by a user (e.g. by means of pressing a key). This is possible since the component 16-2 is already supplied by the voltage supply 40 via the signal line 36. In this context, it must be noted that only the voltage supply 40 and the second activation device 42 must be activated. The switch 24 (Ethernet switch) could only be activated as a consequence of this activation. In this context, the basic sequence is as described before. The switch device 14 can detect the link activity by the second activation device 42 and activate its corresponding port. The communication link is thus set up.

To activate the network component 16-3 via the network manager 20, the network manager 20 communicates with the switch manager 22 of the switch device 14 and initiates the activation of the network component 16-3. The switch manager 22 thereupon activates the coupling-in of the supply voltage onto a line of the corresponding network segment 26 at the voltage supply 40. The network component 16-3 is activated immediately as soon as it is supplied with voltage. In other words, this network component 16-3 is for this case equal to its first activation device 38 and the network function control signal 30 is formed by the admission of the power supply via the signal line 36. In this case, the network component 16-3 does not need any activation device designed as an energy detect module.

Figure 7:
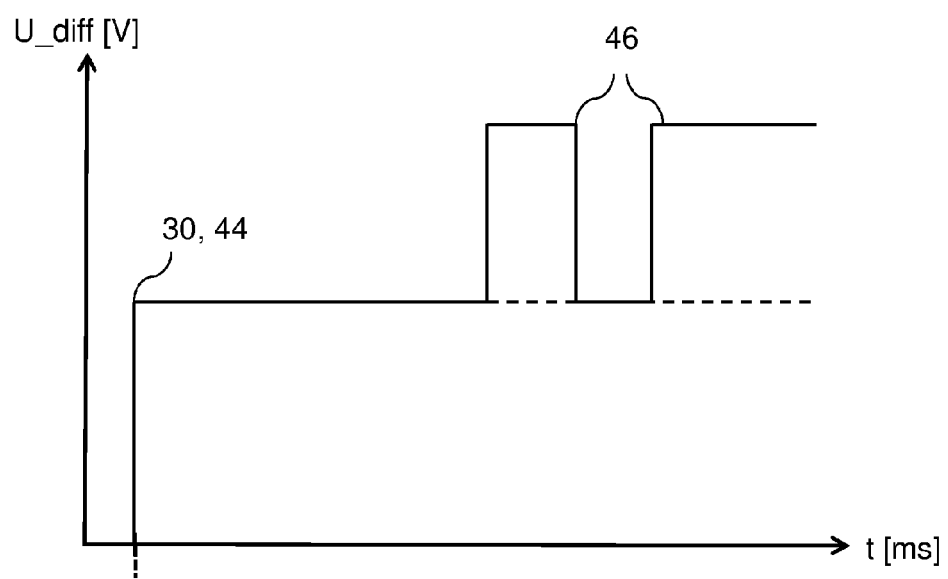
FIG. 7 is a network function control signal, configured as the voltage supply modulated with data transmission signals.

FIG. 7 shows a corresponding network function control signal designed for admission of the power supply, namely the rising edge 44, and data transmission signals 46 modulated onto the power supply.

Figure 8:
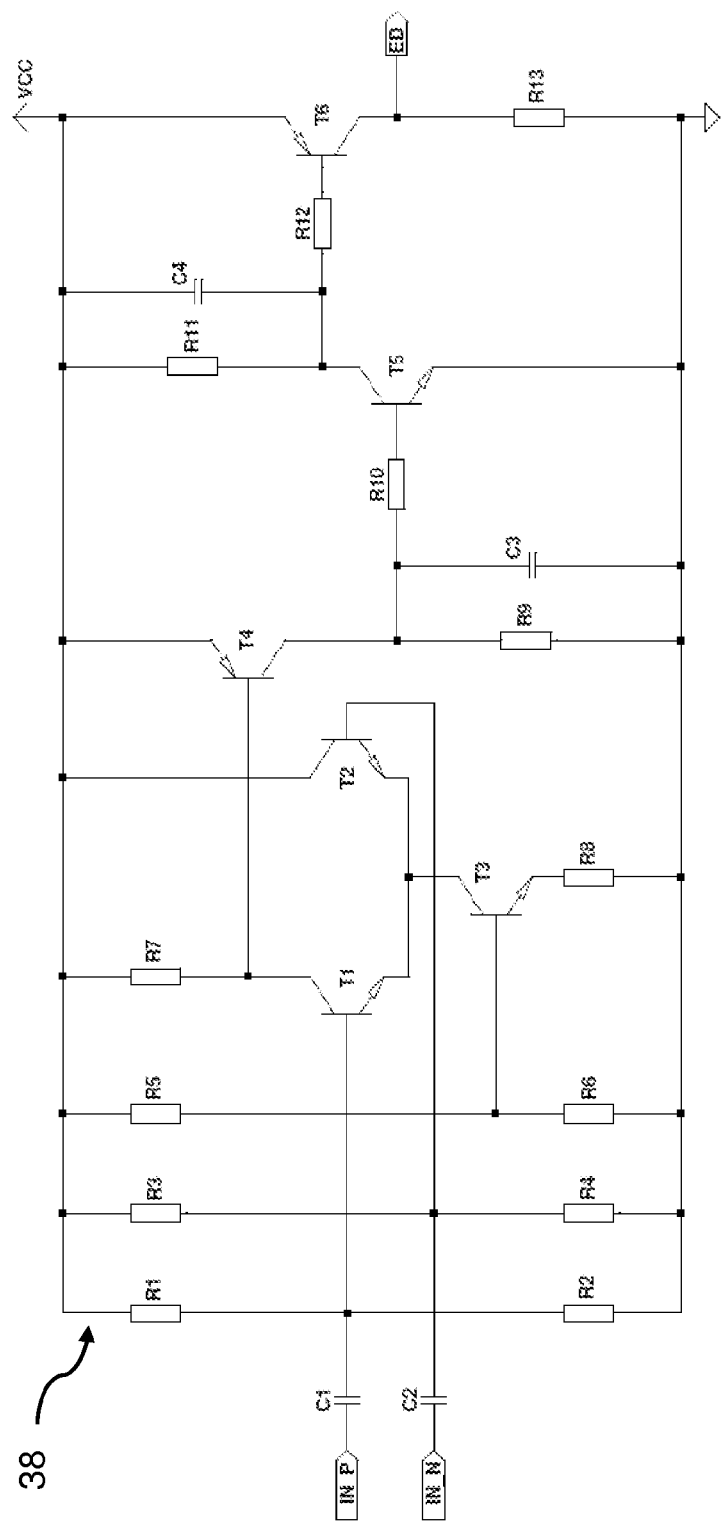
Figure 9:
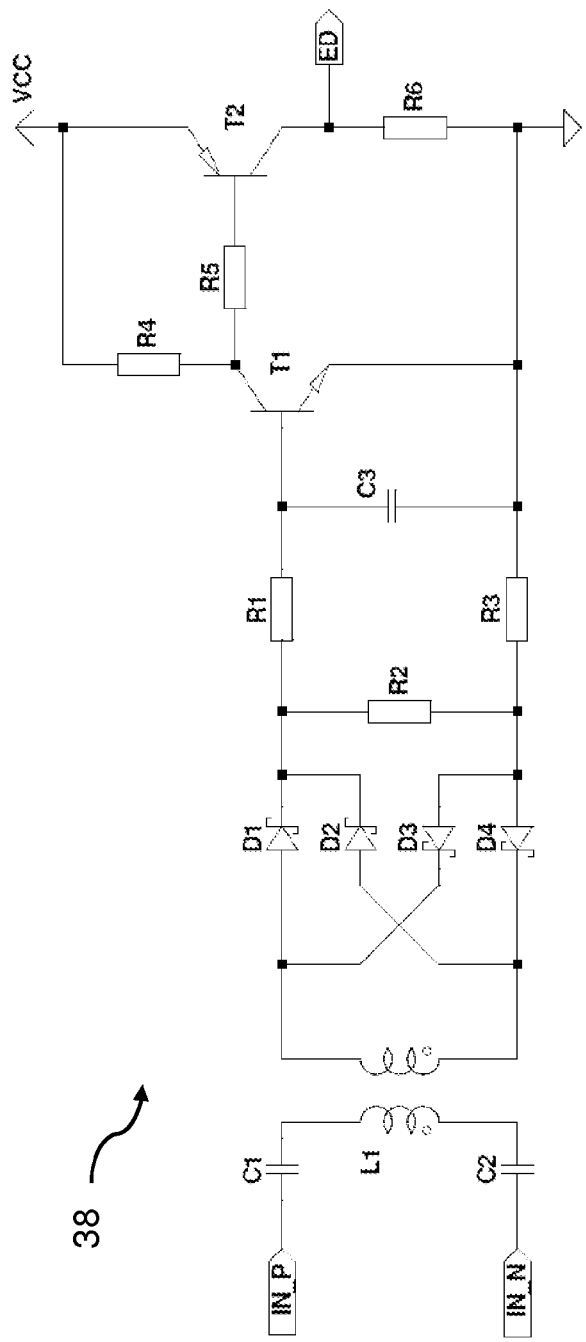

FIGS. 8-10 show three exemplary embodiments of the activation device 38. However, other implementations are also possible.

The first circuit arrangement (FIG. 8) is capable of detecting voltage pulses on a signal line 36 connected via signals to inputs IN_P and IN_N and to activate the associated network component 16, by the electrical output ED. In this embodiment, the first activation device 38 has a low idle-current demand.

This implementation of the activation device 38 includes a differential amplifier, formed of components T1-T4 and R1-R9 which preamplifies the differential signal of the signal line and converts it into a ground-related signal. This is followed by a plurality of amplifier stages (two stages consisting of components T5-T6, R10-R13, and C3-C4 in the illustrated circuit) that further amplify the ground-related signal and, in doing so, increase the pulse width. The constant output level obtained having a periodic occurrence of input pulses is used for activating the associated network component 16.

The second circuit arrangement (FIG. 9) is capable of detecting communication signals on the signal line 36, which is connected via signals to inputs IN_P and IN_N and activate the associated network component 16 by the electrical output ED (see FIG. 9). In this embodiment, the first activation device does not have any idle-current demand apart from drift currents.

This second implementation of the activation device 38 comprises a transformer (L1) for converting the differential input signal into a ground-related signal. The subsequent bridge rectifier (D1-D4), in conjunction with the downstream filter (R1-R3, C3) delivers a constant level to the transistor T1 during communication activity. This level is amplified by an amplifier circuit (consisting of T1-T2 and R4-R6 in the illustrated circuit) and used for actuating the associated network component 16.

The third circuit arrangement (FIG. 10) is capable of detecting communications signals on the signal line 36 which is connected via signals to inputs IN_P and IN_N and activating the associated network component 16 by means of the electrical output ED. In this embodiment, the first activation device 38 does not exhibit any idle-current demand, apart from drift currents, and can be implemented using very few components.

This third implementation of the activation device 38 consists of a MOSFET T1 that has a low threshold voltage. This MOSFET becomes conductive due to communication activity on the signal lines 36, the resultant current flow causing a voltage drop across resistor R1. This voltage is amplified by a downstream amplifier stage (consisting of T2, R4-R5 and C3 in the illustrated circuit) and utilized for activating the associated network component 16. The resistors R2 and R3 have a very high resistance in order to ensure that the signal lines 36 are decoupled from the supply voltage and ground.

While there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for activating at least one temporarily inactive network component of a network system for a vehicle, comprising:
   connecting, for signal communication, a central network device of the network system to the at least one temporarily inactive network component via a path inside the network system, which leads at least partially across a network segment of the network system;
   connecting, for signal communication, the at least one temporarily inactive network component and its associated first activation device via the network segment, the first activation device being directly connected in an unbranched configuration to only a switch device and an associated second activation device, wherein the switch device is arranged between the central network device and the at least one temporarily inactive network component;
   addressing, by the central network device, the first activation device by the switch device by sending a network function control signal;
   activating the at least one temporarily inactive network component by the first activation device in response to the network function control signal; and
   sending, by the first activation device subsequent to activation, a further network function control signal to a second activation device that confirms the activation.

2. The method as claimed in claim 1, further comprising:
   supplying electrical power at least during the activation from the central network device to at least one of the at least one temporarily inactive network component and the first activation device by the switch device via at least one signal line of the network segment.

3. The method as claimed in claim 2, wherein the electrical power is supplied simultaneously with two-way alternate signal transmission between the first activation device and the second activation device via the at least one signal line.

4. The method as claimed in claim 1, wherein the second activation device brings the switch device into a transmitting/receiving state after receipt of the further network function control signal.

5. The method as claimed in claim 1, wherein the network system is an Ethernet network.

6. The method as claimed in claim 1, wherein the network system has a tree topology formed by the central network device, the switch device, and the at least one temporarily inactive network component.

7. The method as claimed in claim 1, wherein at least one of the at least one temporarily inactive network component and the central network device is at least part of a control device of a vehicle component.

8. A network system of a vehicle, configured to activate at least one temporarily inactive network component, comprising:
   a path within the network system, the path leading at least partially across a network segment of the network system;
   a switch device;
   a central network device connected directly to the at least one temporarily inactive network component for signal communication via the path within the network system;
   a first activation device associated with the at least one temporarily inactive network component and directly connected via the network segment for signal communication unbranched to only the switch device and configured to be addressed by the central network device by a network function control signal sent by the switch device; and
   a second activation device associated with the switch device,
   wherein the switch device is arranged between the central network device and the at least one temporarily inactive network component, and
   wherein the first activation device is configured to send a further network function control signal to the second activation device for confirming the activation.

9. The network system as claimed in claim 8, wherein the at least one temporarily inactive network component and its associated first activation device are supplied with electrical power by the central network device by the switch device via at least one signal line of the network segment.

10. The network system as claimed in claim 9, further comprising means for supplying the switch device, the at least one temporarily inactive network component, the first activation device, the second activation device, and the at least one signal line with electrical power supplied simultaneously with two-way alternate signal transmission between the first activation device and the second activation device via the at least one signal line.

11. The network system as claimed in claim 8, wherein the network system is an Ethernet network.

12. The network system as claimed in claim 8, configured as a tree topology formed by the central network device, the switch device and the at least one temporarily inactive network component.

13. The network system as claimed in claim 10, wherein the first activation device comprises:
   a differential amplifier coupled to the at least one signal line; and
   at least one amplifier stage coupled to an output of the differential amplifier and configured to increase a pulse width of an output of the differential amplifier;
   wherein the first activation device has a low idle current demand.

14. The network system as claimed in claim 10, wherein the first activation device comprises:
   a transformer coupled to the at least one signal line;
   a bridge rectifier coupled to an output of the transformer;
   a filter coupled to an output of the bridge rectifier; and
   an amplifier coupled to an output of the filter;
   wherein the first activation device has no idle current demand above a drift current.

15. The network system as claimed in claim 10, wherein the first activation device comprises:
   a MOSFET with a low threshold voltage coupled to the at least one signal line;
   a resistor having a voltage drop across it that is induced by communication activity on the at least one signal line; and
   an amplifier configured to amplify the voltage drop across the resistor;
   wherein the first activation device has no idle current demand above a drift current.

* * * * *